Nov. 9, 1954  M. J. JOHNSON  2,694,026
TYPEWRITER PAD
Filed Aug. 14, 1951

INVENTOR.
Merle J. Johnson
BY
His Agent

United States Patent Office 2,694,026
Patented Nov. 9, 1954

2,694,026

TYPEWRITER PAD

Merle J. Johnson, Portland, Oreg.

Application August 14, 1951, Serial No. 241,751

1 Claim. (Cl. 154—54)

This invention pertains to pads of the sound and vibration deadening type, and relates particularly to the novel construction of a pad especially suited for supporting office machines and the like, which pad not only provides the above sound and vibration deadening qualities but in addition affords complete stability of the machine supported thereon.

The proper supporting of typewriters and other office machines upon desks, stands and other supports has long remained one of the most difficult and serious problems of office management, both from the standpoint of operating efficiency as regards noise and vibration elimination and of safety to the machines. Thus, for example, felt pads have been placed under the machines, either as individual units secured to or otherwise positioned under the feet of the machine or as a blanket covering the entire area underlying the machine. In either case the felt functions quite effectively to deaden the sound and also reduces the transmission of vibration to the supporting desk or stand. But the felt pads slide too easily over the surface of the support, with the result that the operator is required continually to restore the machine to its proper and desired position during use. Moreover, machines mounted upon felt pads are often knocked or pushed completely off a desk or stand upon accidental contact by persons walking past the machine, and the expense of repair or replacement due to such damage has become of major concern.

In order to overcome the disadvantages of continual displacement of machines mounted upon felt pads, various means have been employed to bolt or otherwise secure the machine positively to the desk or other support. In the simpler devices provided for this purpose, the sound and vibration deadening qualities of the felt are completely destroyed, for the securing means functions to conduct the sound and vibration directly to the support. More complex devices have been proposed to avoid this direct connection, but they are expensive both as regards cost of manufacture and of maintenance and repair.

Moreover, the bolting or otherwise securing the machine firmly to a desk is attended by the inherent disadvantage that the machine cannot be moved at all, or even adjusted to individual desires, without complete disassembly and revision. In addition, positive attachment of the machine to a rigid support prevents the absorption of shock of moving parts of the machine, with the result that excessive wear, repair and readjustment of the machine is incurred.

Another type of machine support pad in general use is constructed entirely of relatively solid but flexible rubber. Compared with felt, this type of pad is less susceptible of displacement upon a desk during operation of the machine, but its inability to deaden sounds and vibrations renders its use an an office machine pad completely unsatisfactory.

A third type of machine pad also in general use is constructed entirely of sponge rubber. The porosity of this material provides satisfactory sound and vibration deadening quality when employed in sufficient thickness, and is generally satisfactory as regards its resistance to displacement relative to the supporting desk or stand. But in order to preserve satisfactory deadening quality the required thickness of the sponge rubber pad is of such magnitude that the machine mounted thereon is caused to bounce excessively during operation. This bouncing results in a noticeable decrease in efficiency of operation primarily because of the deleterious effect upon the normal feel, touch and rhythm essential to most efficient operation. On the other hand, the reduction of this bouncing to a practical minimum requires decreasing the thickness of the sponge rubber pad to such an extent as to render it unsatisfactory as a deadener of sound and vibration.

Thus, from the foregoing, it is apparent that certain critical disadvantages attend the use of conventional supporting pads: The felt pad is too readily displaced upon a desk; the solid rubber pad is ineffective in deadening sound and vibration; and the sponge rubber pad, when employed in sufficient thickness to deaden sound and vibration, causes the machine to bounce excessively during operation. Moreover, all of these disadvantages are magnified to a considerable extent when the pads are used to support electrically operated office machines, for the moving actions of these machines are markedly more severe than the manually operated machines.

Accordingly, it is a principal object of the present invention to provide a supporting pad for office machines and the like, by the use of which pad all of the operating disadvantages discussed hereinbefore are completely eliminated.

Another object of this invention is the provision of a supporting pad of the type described which is of extremely simplified construction and, therefore, economical manufacture.

These and other objects and advantages of the present invention will appear from the following detailed description taken in connection with the accompanying drawing, in which.

Figure 1:
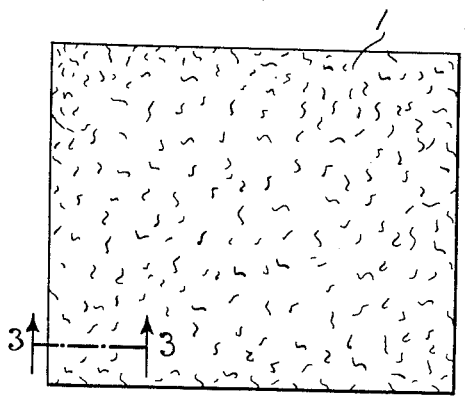
Figure 1 is a top plan view of a typewriter pad embodying the features of this invention.

In the development of the present invention recognition was given to the superiority of felt in deadening sounds and vibrations, and to the tenacity with which the sponge rubber pad resists displacement relative to the desk or stand. But the lamination of a conventional felt pad and a conventional sponge rubber pad does not overcome the deleterious effects of bounce inherent in the use of the sponge rubber pad. Accordingly, a lamination of the felt pad and a thin layer or film of sponge rubber of a thickness comparable to a sheet of fabric was produced and tested.

These tests proved that the film of sponge rubber as a base for the felt pad retained a substantial degree of the resistance to displacement ordinarily characterizing the conventional sponge rubber pad. However, this lamination was found to be structurally incapable of extended use for mounting those types of office machines whose movements resulted in relatively severe shock, for in such instances the felt tended to become torn away from the sponge rubber film adjacent the bond line. For example, it was found that the lateral shock occasioned by the abrupt arrest of the carriage of an electric typewriter during tabulation and carriage return was of sufficient magnitude ultimately to cause separation of the felt adjacent the bond line in the areas of the feet of the machine.

The film of sponge rubber exhibited decreased ability to resist displacement relative to the surface of the desk or stand compared with the conventional thick sponge rubber pad. This is due in part to the fact that the thin layer of sponge rubber tends to conform closely to the uneven contour of the abutting surface of felt, whereby much of the area of the sponge rubber layer remains out of contact with the supporting surface. The resistance to displacement also decreases with time, for the sponge rubber film tends to harden over extended periods of exposure to the atmosphere.

Referring now to the drawing, the pad of the present invention comprises the lamination of a thickness of felt 1 and a reduced thickness of sponge rubber 2 bonded together by a thin adhesive layer 3, or by vulcanization, or by other means well-known in the art. Various types and grades of felt, and other sound and vibration deadening materials of the felt type, readily available from commercial sources are suitable for the purposes of this invention.

Figure 2:
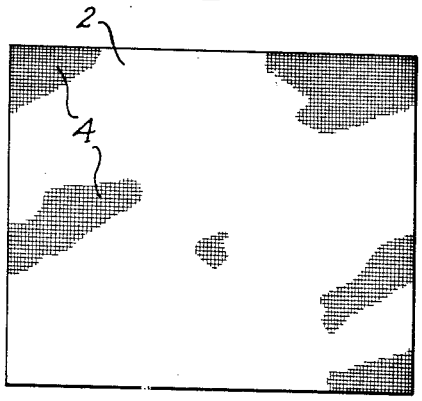
Figure 2 is a bottom plan view of the pad shown in Figure 1.
Figure 3:
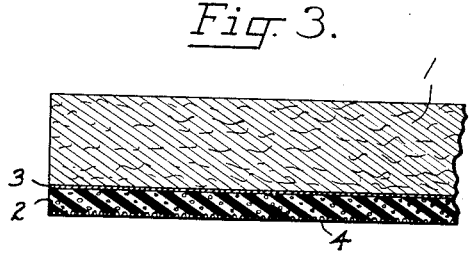
Figure 3 is an enlarged fragmentary sectional view of the pad taken along the line 3—3 in Figure 1.

The sponge rubber preferred for the present use is formed on one surface with a multitude of fine raised ribs 4 arranged in a pattern of crossed lines, as best illustrated in Figure 2 of the drawing. These crossed ribs define minute pockets therebetween which function as a myriad of tiny suction cups. The surface of the sponge rubber is soft and pliant. Thus, by the combined action of the suction cups and the soft surface of the rubber, the sponge rubber is held in contact with the surface of a desk or stand with such frictional tenacity that its removal is achieved only by lifting it from said surface. This type of sponge rubber is well-known in the art and does not per se form a part of the present invention.

Figure 5:
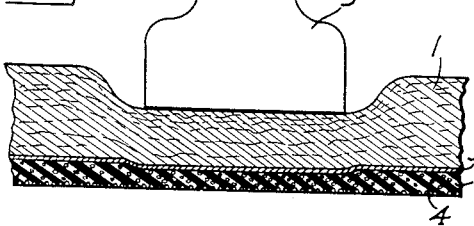
Figure 5 is a fragmentary sectional view of the pad shown in Figure 3 and illustrating the reaction thereof to the weight of one foot of a typewriter.
Figure 6:
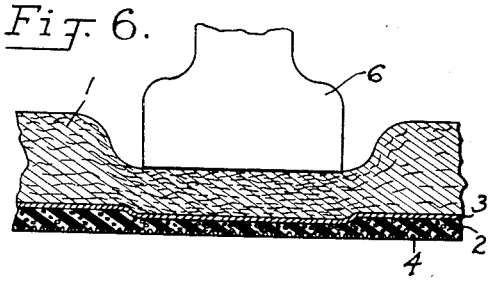
Figure 6 is a fragmentary sectional view of the pad shown in Figure 5 and illustrating the reaction thereof to the weight of one foot of a heavier typewriter.

It has been discovered that for the purposes of this invention the thickness of the sponge rubber layer must be maintained within rather definite and critical limits. These limits are dependent in part upon the thickness of the felt layer and in part upon the weight of the machine to be supported. For example, the pads shown in Figures 5 and 6 are of identical construction. Figure 5 illustrates the reaction of the felt and rubber layers to the weight of one foot 5 of a standard mechanical office typewriter while Figure 6 illustrates the reaction of said layers to the weight of one foot 6 of the heavier electric office typewriter. It is apparent that although the depression of the felt layer is substantially greater in Figure 6 than in Figure 5, the depression of the sponge rubber layer in Figure 6 is only slightly more than the degree of depression shown in Figure 5. Thus, a single pad of the present invention may be employed to support machines varying in weight within rather wide limits.

Figure 7:
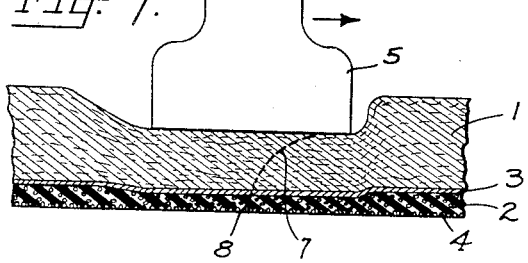
Figure 7 is a fragmentary sectional view of the pad shown in Figure 5 and illustrating by dotted lines the reaction of the pad to lateral movement of the typewriter during carriage return.

It has been discovered, however, that a certain minimum thickness of sponge rubber must be maintained in order for the pad to function in proper manner. Referring to Figure 7 of the drawing, the pad of Figure 5 is shown in a condition of lateral stress resulting from the movement of the typewriter foot 5 to the right (see arrow) as when the typewriter carriage has been arrested suddenly upon its return to begin a new line of typing. This movement of each foot 5 causes the fibers of the felt layer 1 to be moved to the right through distances which decrease progressively downward through the thickness of the felt layer, as indicated by the dotted line 7.

The movement of the felt fibers adjacent the adhesive line 3 induces a lateral stress on the layer of sponge rubber. If the sponge rubber layer is merely a film, as described hereinbefore, no lateral movement through the thickness of the film is available, and therefore the lateral stress is impressed entirely upon the felt fibers. As previously described, this stress may be of such magnitude as to cause the felt fibers to be torn apart adjacent the adhesive line 3. It is important, therefore, that the layer of sponge rubber 2 be of sufficient thickness that when a machine is mounted upon the pad the sponge rubber layer underlying the feet 5 is still thick enough to permit a limited degree of lateral movement through said thickness, as indicated by the dotted line 8 in Figure 7. This thickness of sponge rubber functions to respond to the lateral stress of the felt fibers adjacent the adhesive line 3 and, by thus moving laterally through its thickness, to relieve the strain on the fibers which tend to pull the latter apart.

Certain machines of lighter weight may require a supporting pad having a thinner layer of sponge rubber in order to overcome any undesirable degree of vertical bounce which may occur during operation of the machine. On the other hand, a thicker layer of sponge rubber may be required for heavier machines in order to maintain the above described minimum thickness of sponge rubber under the feet of the machine.

In any case, the proper thickness of the sponge rubber layer for any particular installation is determined primarily upon the provision of the foregoing minimum thickness which will accommodate a limited degree of lateral movement through said thickness. Thickness exceeding this minimum requirement may be used if desired, but in no instance should such increased thickness be of such magnitude as to cause noticeable bouncing of the machine.

By way of illustration, supporting pads of the present invention have been constructed in which the felt layer varied in thicknesses from about ¼ inch to about 1 inch and the sponge rubber layer varied correspondingly from about ¹⁄₁₆ inch to about ¼ inch. That is to say, the pad having a felt layer of about ¼ inch and a sponge rubber layer of about ¹⁄₁₆ inch was used to support the smallest and lightest office machines while the pad having a one inch felt layer and a ¼ inch sponge rubber layer was used to support the heaviest of the conventional office machines. This range of thicknesses was found to be completely satisfactory as regards the reduction of sounds and vibrations, the elimination of displacement of the machine and the elimination of objectionable vertical bounce. For standard mechanical and electric office typewriters a pad having a felt layer about ½ inch in thickness and a sponge rubber layer about ⅛ inch thick was found to give excellent results.

It will be apparent to those skilled in the art that the proportionate thicknesses of the felt and sponge rubber layers may be varied to accommodate specific uses. For example, some machines create lesser magnitudes of sounds and vibrations than other machines of equal weight. Thus, the felt layer may be reduced in thickness for the former installations, if desired.

Figure 4:
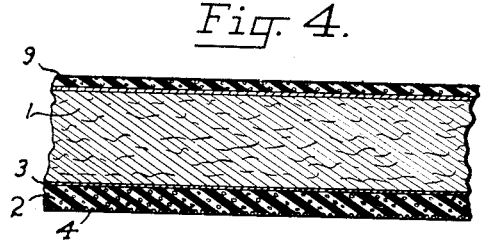
Figure 4 is a fragmentary elevation of a modified form of pad embodying features of the present invention.

There are several types of office machines which are provided with no supporting feet, but which have a plane base of substantial area. The base may cover the entire bottom of the machine or it may be formed as a broad rim surrounding the peripheral area of the machine. In either case it has been found that where such machines are light in weight it is desirable to provide a thin layer of sponge rubber 9 over the upper surface of the felt, as shown in Figure 4 of the drawing. This layer 9 is preferably formed as an open band whereby to expose a substantial portion of the surface of the felt layer and thereby provide for maximum absorption of sound. When used with machines having a broad rim base, the band 9 preferably corresponds in shape with said broad rim base.

It will be apparent to those skilled in the art that various changes in structural details of the pad may be made within the scope and spirit of the present invention. For example, small pads of the laminated construction described hereinbefore may be made and used as individual pads for each foot of a machine. These pads may either be positioned freely under each foot or they may be constructed for permanent or releasable attachment to said feet, in manner well-known in the art. In any case, however, it is important that the minimum thickness of the sponge rubber layer 2 be maintained, as explained hereinbefore.

As stated hereinbefore, various types and grades of felt may be used as the sound and vibration deadening layer 1. Also usable for this purpose are other felt-like materials, i. e. those which possess the deadening quality of felt and which are formed in the mat-like construction of felt. It has also been stated hereinbefore that sponge rubber is preferred for the under layer 2. However, other forms of rubber may be available which possess the required properties exhibited by sponge rubber, i. e. the rubber must be soft and pliant, whereby to resist displacement relative to a supporting surface, and it must be capable of lateral movement through its thickness, whereby to prevent destruction of the lamination. Accordingly, the equivalent materials permissible of use for the present invention are defined in the claims as felt-like and as sponge-like materials, respectively.

The pad of the present invention has been described hereinbefore with reference to its use in supporting office machines. It will be apparent that the pad may be used with equal advantage and facility to support other types of devices and machines which, like office machines, are subjected to vertical and/or horizontal shock during use.

From the foregoing, it is apparent that the present invention provides many advantages heretofore not made available by the structures of the prior art. The supporting pad of this invention provides for the efficient reduction of sound and vibration and completely eliminates displacement of machines supported thereon without incurring vertical bounce and without the former necessity of securing the machine positively to the supporting base. Through the present discovery of the minimum thickness of the sponge rubber layer in lamination with a greater thickness of felt, lateral shock of the machine being supported is effectually absorbed without destruction of the pad lamination and without incurring the vertical bounce inherent in the conventional sponge rubber pad. Greater ease and efficiency of operation results, and the operating life of the machine is considerably extended.

Having now described my invention and the manner in which the same may be used, what I claim as new and desire to secure by Letters Patent is:

A supporting pad for typewriting machines, comprising a main upper body of felted fibrous material having a thickness of about one-half inch, and an under layer of sponge rubber having a thickness of about one-eighth inch bonded to the under surface of the main upper body, the main upper body thereby constituting the major proportion of the thickness of the pad, the rubber under layer thereby being characterized by being compressible under the weight of the machine supported upon the pad to a reduced thickness at which to prevent noticeable vertical bounce of the said machine while permitting lateral movement through said thickness of rubber.

References Cited in the file of this patent

UNITED STATES PATENTS

| Number | Name | Date |
| --- | --- | --- |
| 690,772 | Revalk | Jan. 7, 1902 |
| 1,499,166 | Frazier | June 24, 1924 |
| 2,198,724 | Schreiner | Apr. 30, 1940 |
| 2,572,470 | Gordon | Oct. 23, 1951 |

FOREIGN PATENTS

| Number | Country | Date |
| --- | --- | --- |
| 238,006 | Great Britain | Aug. 10, 1925 |